United States Patent
Watts

(10) Patent No.: US 6,587,842 B1
(45) Date of Patent: Jul. 1, 2003

(54) SOFTWARE-BASED PROTECTION SYSTEM FOR SOFTWARE PRODUCTS DISTRIBUTED ON COPYABLE MEDIA, OR DOWNLOADED OVER A COMMUNICATIONS LINK

(76) Inventor: Keith Watts, Box 1, Eliot, ME (US) 03903

( * ) Notice: Subject to any disclaimer, the term of this patent is extended or adjusted under 35 U.S.C. 154(b) by 0 days.

(21) Appl. No.: 09/409,615

(22) Filed: Oct. 1, 1999

(51) Int. Cl.⁷ .............. G06F 17/00; H04K 1/00; H04L 9/00
(52) U.S. Cl. .............. 705/57; 380/4; 380/21; 380/23; 380/25; 380/29; 705/51
(58) Field of Search .............. 702/35; 713/169, 713/168, 170, 171; 380/4, 21, 23, 25, 49; 705/57

(56) References Cited

U.S. PATENT DOCUMENTS 5,337,357 A * 8/1994 Chou et al.
5,917,908 A   6/1999 Takenaka et al.
6,047,242 A * 4/2000 Benson

FOREIGN PATENT DOCUMENTS

JP          411109855 A    4/1999  ............ G09C/1/00

OTHER PUBLICATIONS

Alfred J. Menezes, et al. "Handbook of Applied Cryptography" 1997, CRC Press, pp. 321–322.
Alfred J. Menezes, et al., Handbook of Applied Cryptography, 1997, CRC Press, pp. 321–322.*
"A Gift of Fire", by Sara Baase, p. 179, (1997, Prentice–Hall, Inc., ISBN 0–13–458779–0.

* cited by examiner

Primary Examiner—James P. Trammell
Assistant Examiner—James A. Reagan
(74) Attorney, Agent, or Firm—Patrick R. Scanlon

(57) ABSTRACT

Computer software can be secured so that it only operates on a customer system that has a protection file that is unique to the system. The software is inoperable when copied to other systems, even though the protection file is copied as well. The protection file is sufficiently encoded so that attempts to alter the file for use on another system will be futile. The process of encoding the protection file is sufficiently complex, so that attempts to reverse engineer the construction of the file will also be futile. The logic that encodes the protection file is never available for direct use on the customer system. For software that is distributed on copyable media, the protection file is created by a program on the product distributor's system. When the protection file is prepared during a software download request, multiple programs are used. These programs are encrypted within a composite file. The keys for decrypting these programs are passed as a parameter to a product installation program at the conclusion of the download process. All significant programs associated with the preparation of a protection file on the customer's system are eliminated after the file is created.

19 Claims, 12 Drawing Sheets

Protected software product distribution overview

Figure 1 -- Protected software product distribution overview
Figure 1A -- Protection of software distributed on copyable media
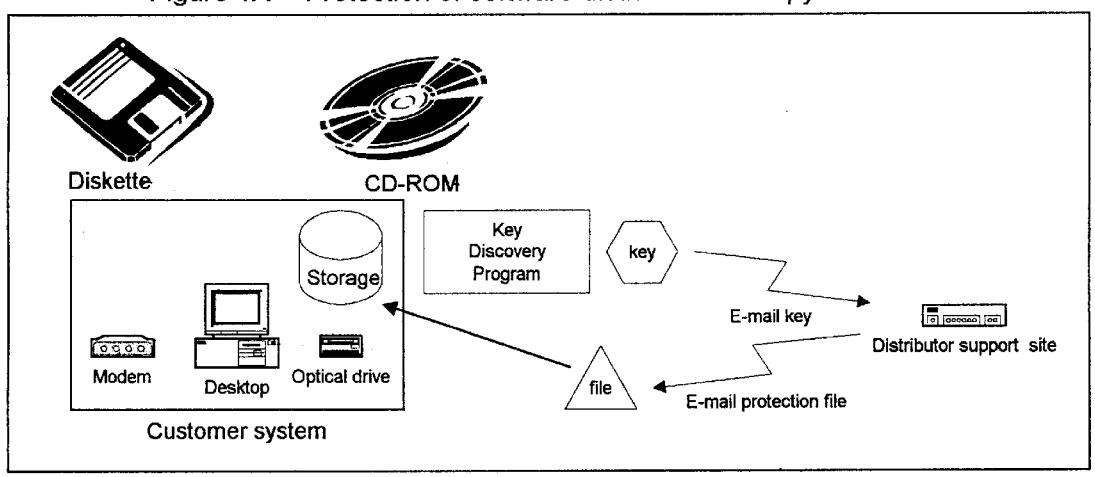
Figure 1B -- Protection of software distributed by communication media download
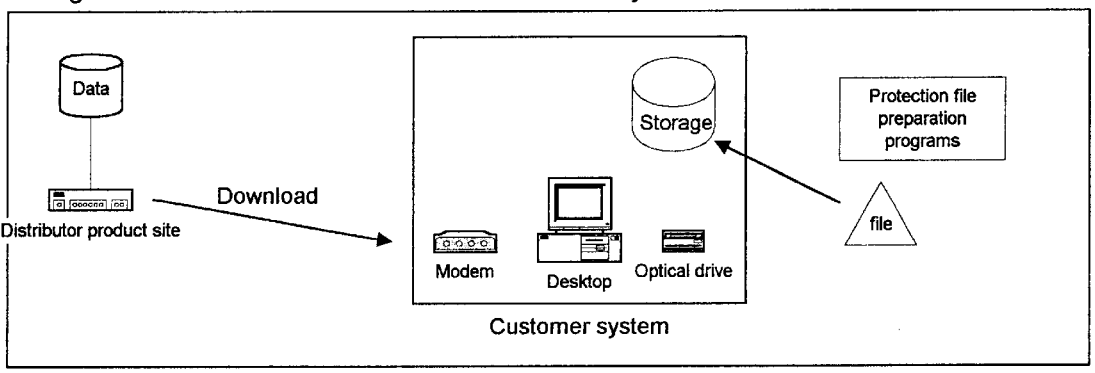

Figure 2 -- Unique system identifier discovery
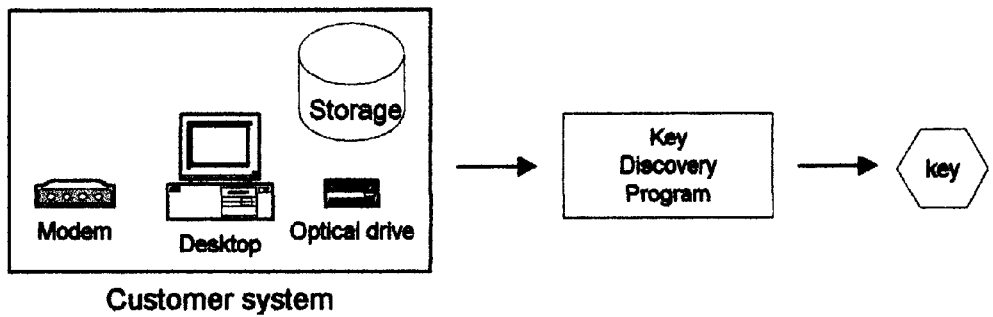

Figure 3 -- Encoding of key within a protection file
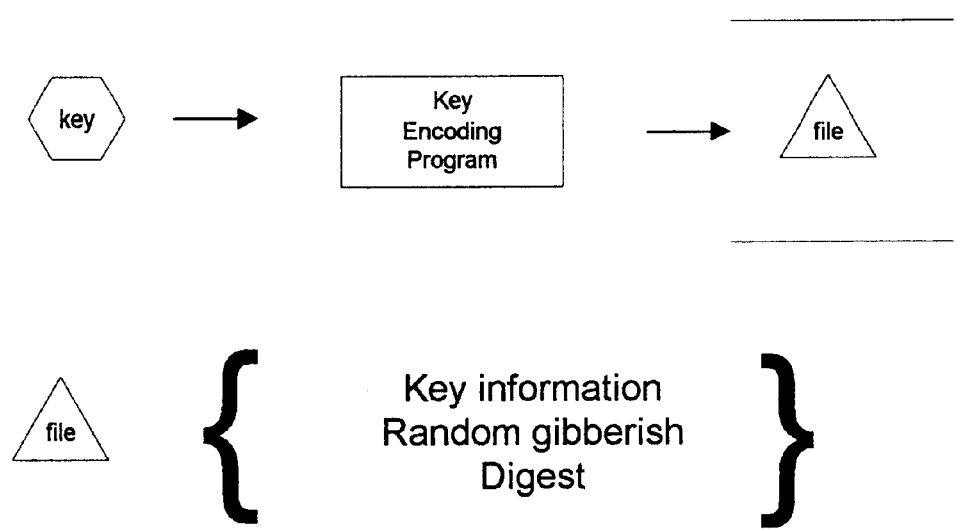

Figure 4 -- Sending key to product distributor
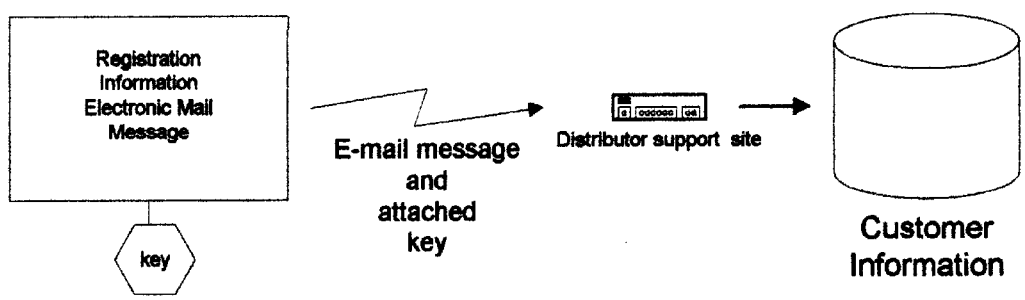

Figure 5 -- Distributor converts key to protection file
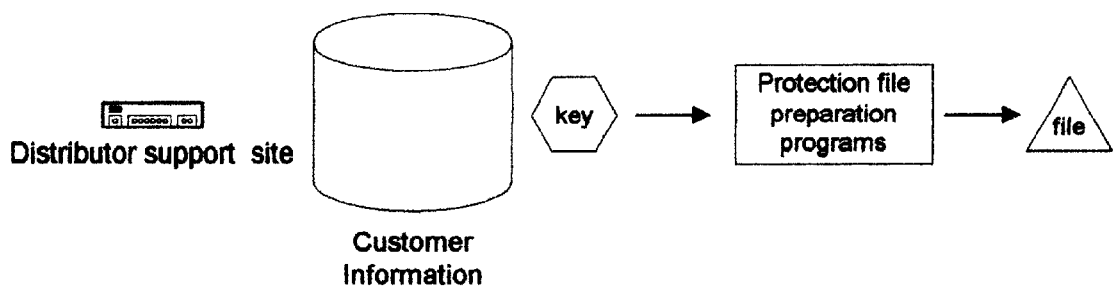

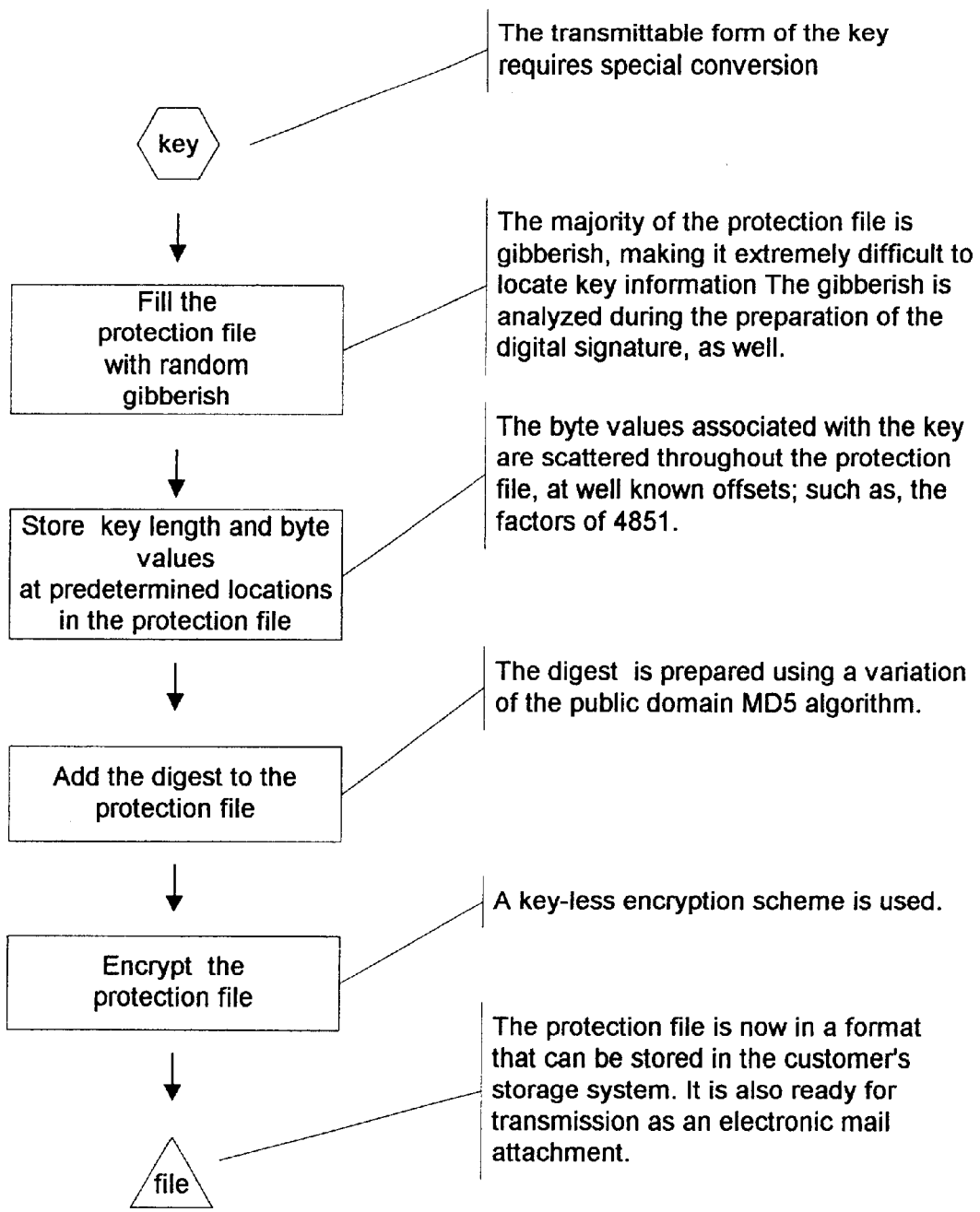
Figure 6 -- Protection file preparation flowchart

Figure 7 -- Sending protection file to customer system
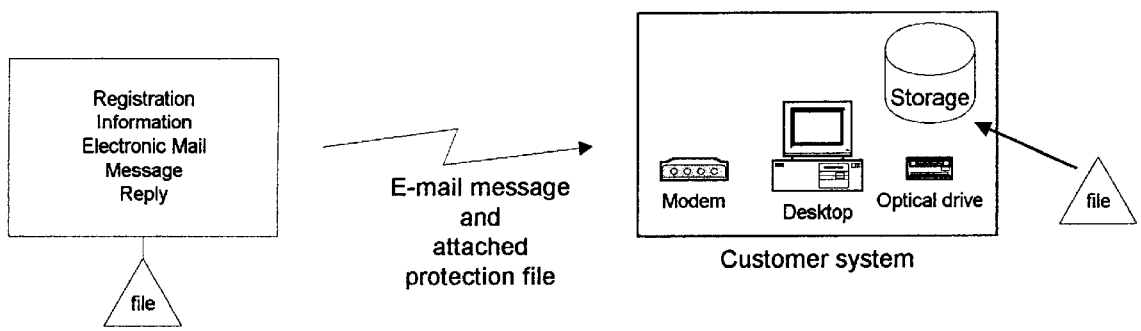

Figure 8 -- Protection file validation flowchart
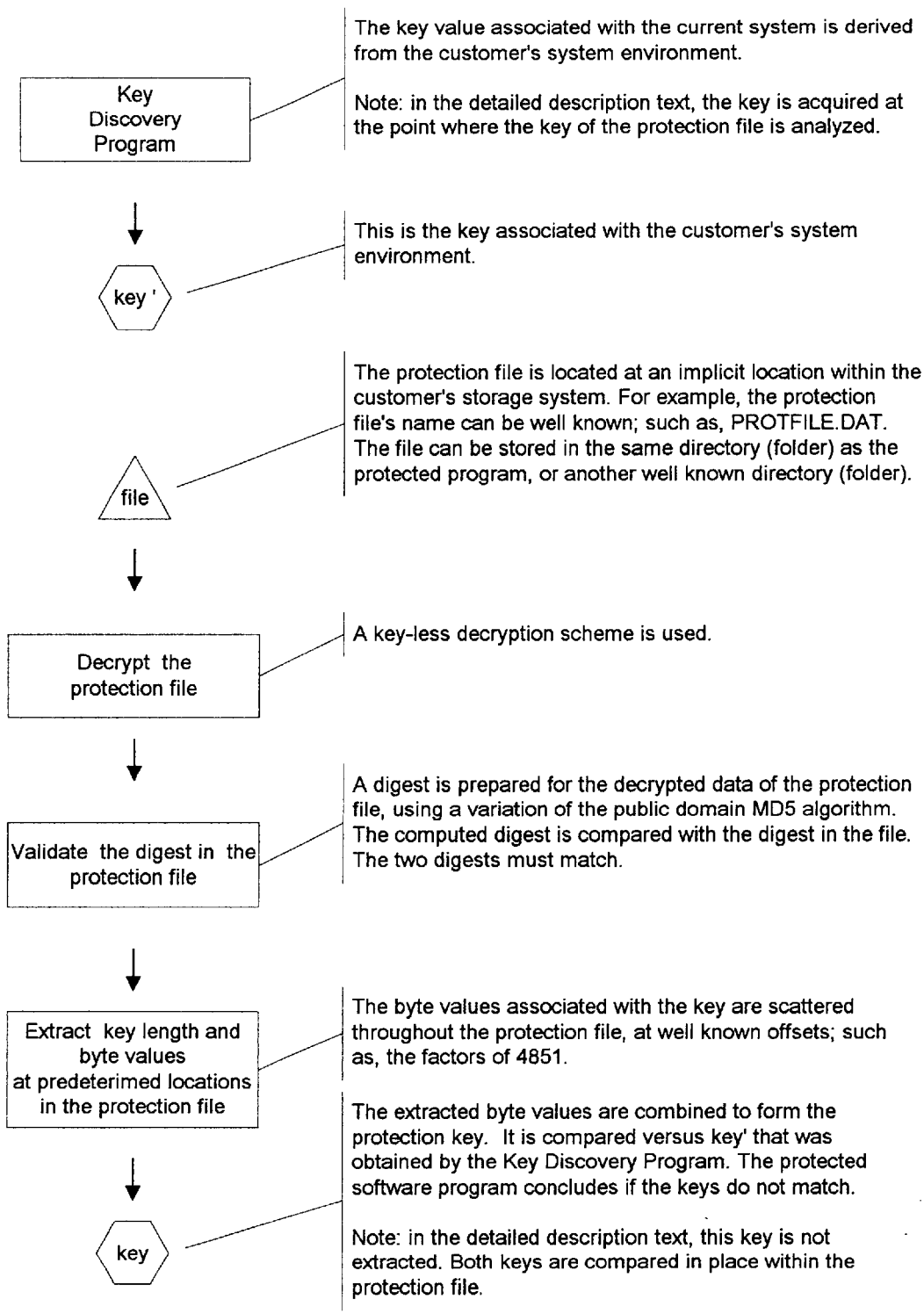

Figure 9-- Generation of protection file during a download product installation
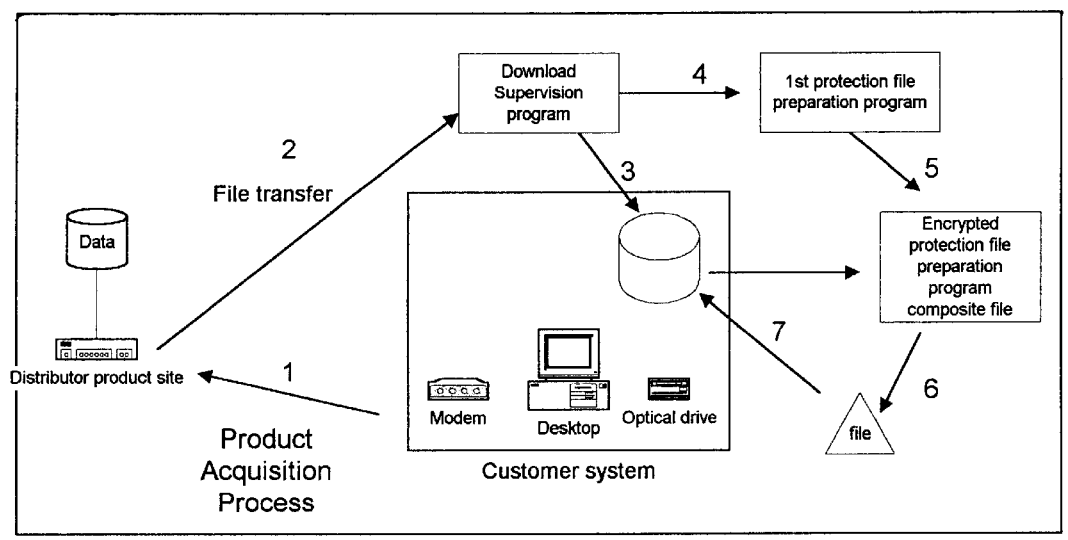

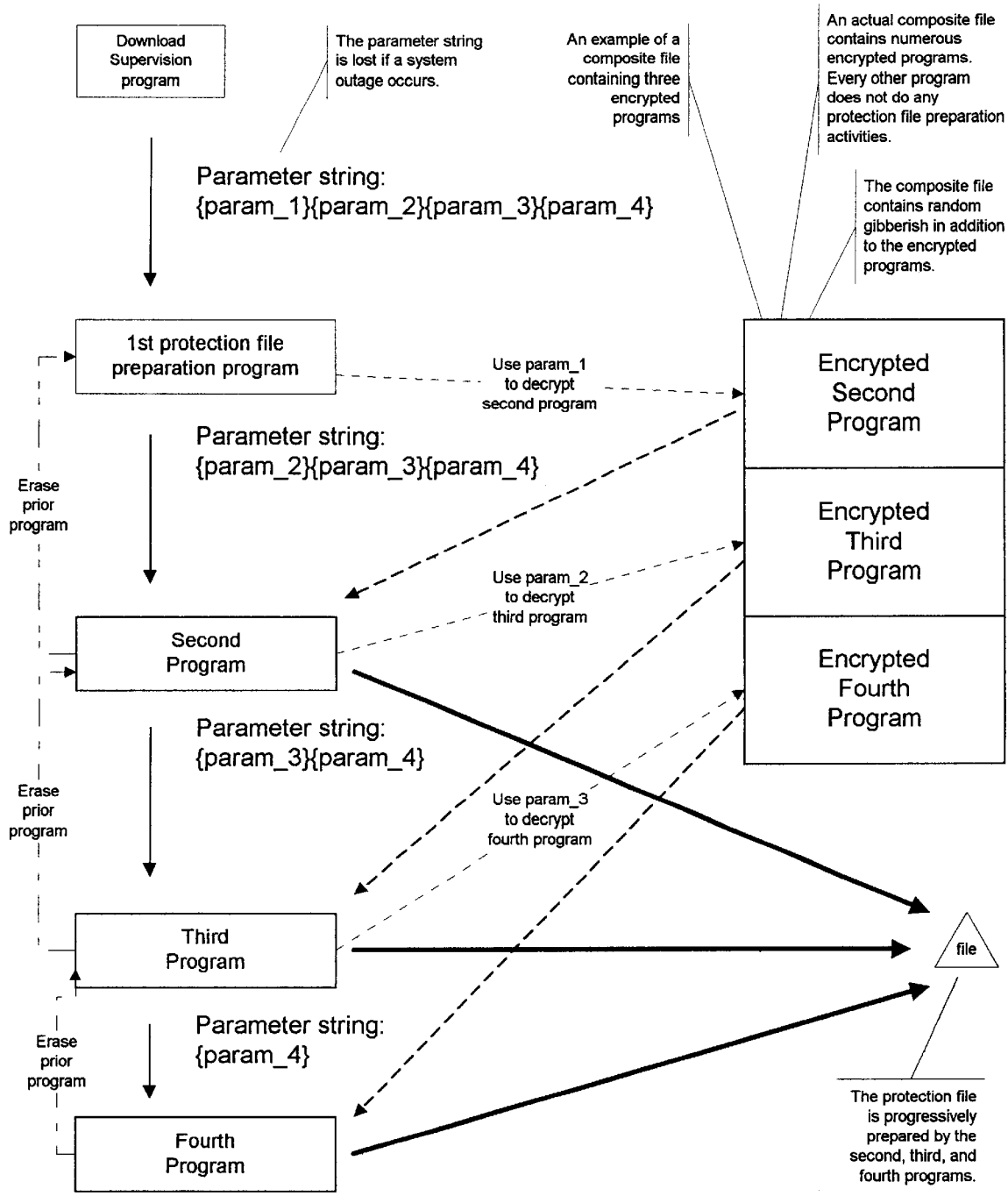
Figure 10 -- Cascading encrypted protection file preparation programs Figure 11 -- organization of the protection file prior to encryption
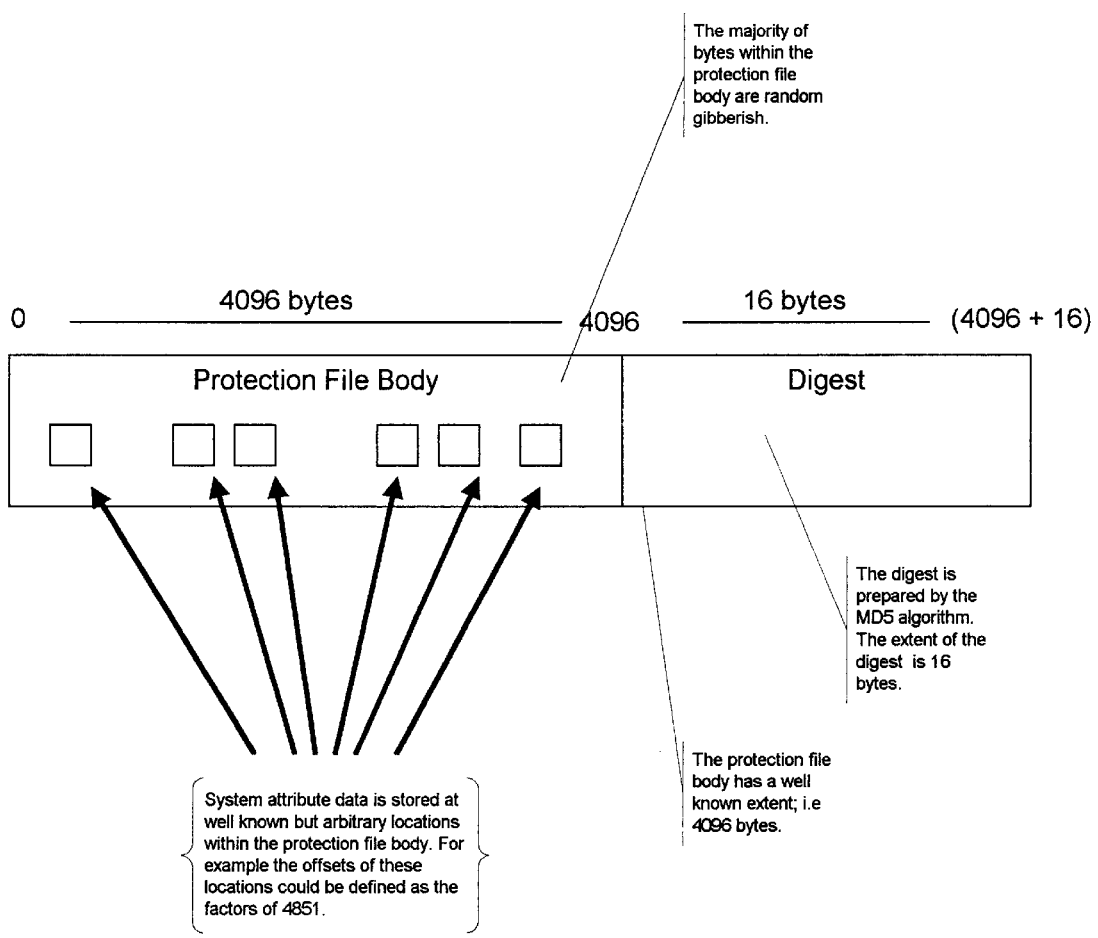

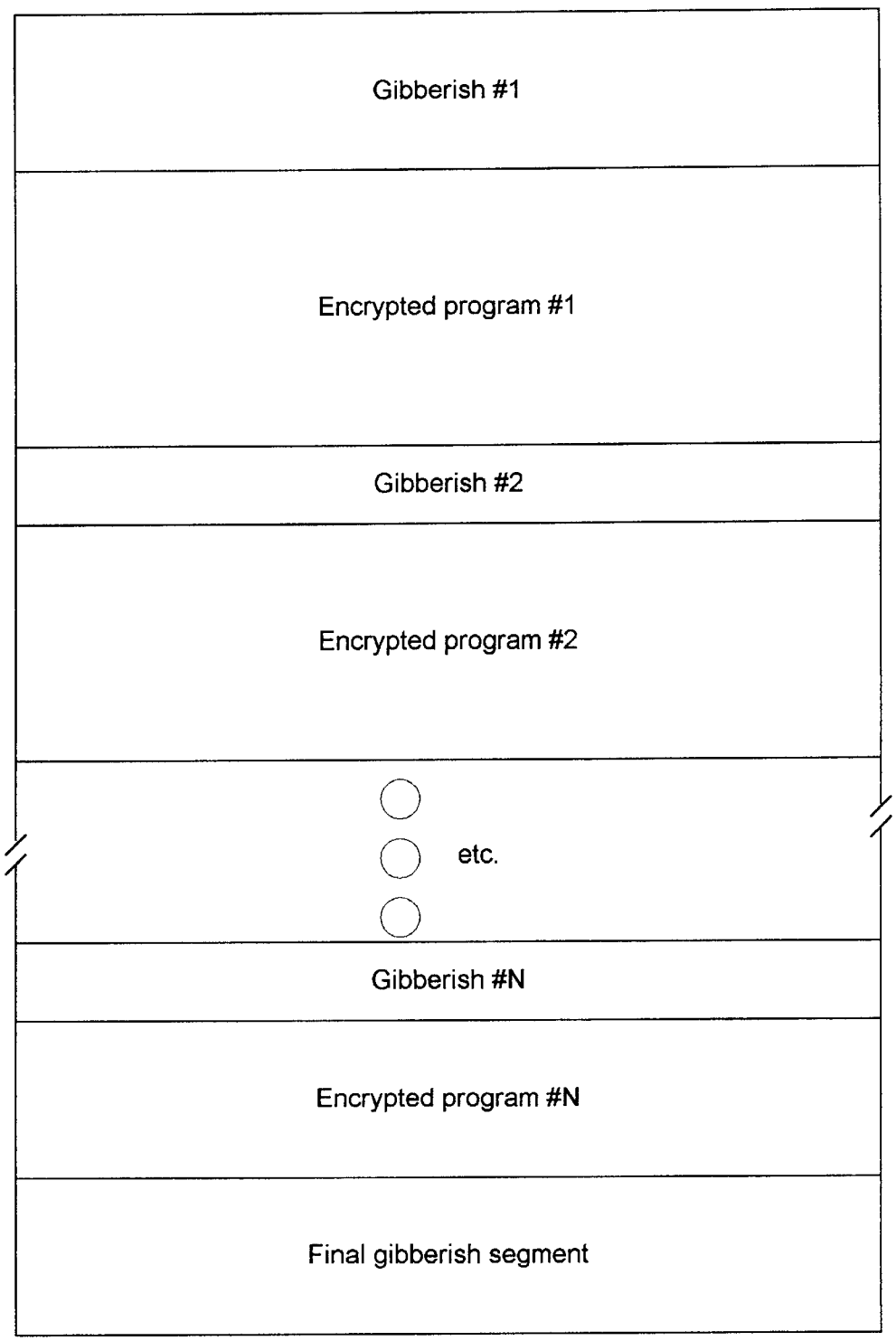
Figure 12 -- Composite file of encrypted preparation programs

US 6,587,842 B1

SOFTWARE-BASED PROTECTION SYSTEM FOR SOFTWARE PRODUCTS DISTRIBUTED ON COPYABLE MEDIA, OR DOWNLOADED OVER A COMMUNICATIONS LINK

BACKGROUND OF THE INVENTION (1) Field of the Invention

Innovations disclosed by the present invention relate to the protection of a computer software product from unfair use on more than one customer system. This invention is based on the use of a protection file that contains internalized attributes that characterize a specific customer system environment. The protection file is encrypted and contains a digest, so that attempts to convert a protection file for use on another system are futile. Programs within the product distributor's software product interrogate the protection file to determine if the internalized attributes correspond with the attributes of the prevailing system environment. The protection file is either prepared on the product distributor's system, or is prepared by special programs that operate on the customer's system. These special programs are contained within an encrypted composite file. At any moment, no more than one of the special programs that participate in protection file preparation is decrypted. Thus, attempts to reverse engineer the process that prepares the protection file are futile.

(2) Description of the Related Art

Various-strategies are used to prevent unfair use of software products today.

The most common technique uses a key, which is a series of characters, that is typed during product installation. Often this key does not contain information regarding the customer's system environment, and the product can be installed on other systems by typing the key during installation there as well.

Another method prepares a special key file (license) that is stored on customer systems, so that the product is only operable if the license is present. However, this method fails if the software is copied to another system, and the license is copied to that system as well; i.e. the license file does not contain information regarding the attributes of a specific system.

Another method uses an electronic device, called a 'dongle', that is attached to a customer's printer port to enforce use of the product on systems that have this device. This requires product distributors to acquire and ship an electronic device with every product shipment. This approach is particularly inappropriate for software that is distributed by communication media downloads.

U.S. Pat. No. 5,917,908 describes a method which encodes a key that is unique to a customer's system environment, along with positional information regarding where the key is stored within the customer's storage media, but this solution always requires an interaction between the customer and the product distributor after the product is received. Furthermore, this patent lacks a method for backing up the protection file, in case the original protection file is lost or damaged.

Problems associated with software protection strategies are described on page 179 of the book "A Gift of Fire", by Sara Baase (1997 by Prentice-Hall, Inc. Upper Saddle River, N.J. 07458; ISBN 0-13-458779-0).

SUMMARY OF THE INVENTION

The present invention is a fail-safe technique for ensuring a software product operates on secured customer systems, without opportunities for reverse engineering the technology that secures these products. A protection file is created that is stored in the storage media associated with a customer's software utilization-system. The protection file contains internalized attributes that characterize a specific customer system environment. The system identifier of IBM mainframe computers, is an example of an attribute that characterizes that system. The protection file is encrypted and contains a digest, so that attempts to convert a protection file for use on another system are futile. Programs within the product distributor's software product interrogate the protection file to determine if the internalized attributes correspond with the attributes of the prevailing system environment.

When the computer software product is distributed on copyable media, the protection file must be created on the product distributor's system environment. The unique attributes of the customer's system environment are encoded within a binary file, that is sent to the product distributor by electronic mail. The binary file that is encoded during this process is not the same as the protection file that.is required for software product usage. Upon receiving the binary file, the product distributor decodes the attributes and prepares the required protection file. The product distributor sends the protection file to the customer by electronic mail, along with instructions describing where the protection file should be placed within the customer's storage medium.

When the computer software product is distributed via a communications media download, the protection file can be created directly on the customer's system environment. However, this requires encryption of the programs that prepare the protection file. These programs create the protection file by a cascade of successive steps. A parameter that is passed to the product distributor's installation program contains the required keys for decoding the programs in all steps. Each program that participates in this process:

eliminates the previous program extracts the key that is required for decrypting the next program decrypts the next program invokes the next program with the remaining parameters after key extraction At the conclusion of the last program, only the last program remains. If a system outage occurs during the protection file preparation process, no more than two programs associated with this process will remain on the customer's system. Every other program, including the first and last program, do not participate in protection file preparation. The logic that is encoded within a single program that participates in protection file preparation should be minimal, to thwart reverse engineering attempts. The parameter that contains the keys for decoding remaining programs, is lost as a consequence of the system outage. The customer must use the technique associated with acquiring a protection file for 'copyable media' that was described above.

Subsequently, the customer can use the technique associated with acquiring a protection file for 'copyable media', in case the protection file is lost or damaged. The customer can also store copies of the protection file on various storage media, and use these as subsequent replacements for a protection file that is lost or damaged.

The invention associated with this patent is characterized by the following significant innovations.

Innovation #1:

attributes that uniquely characterize a customer system can be encoded in a key file.

Innovation #2:
 the key file, prepared by Innovation #1 can be sent to the product distributor, who responds with a protection file.

Innovation #3:
 a protection file can be directly created when software is downloaded using a communication media.

Innovation #4:
 the programs that create the protection file are encrypted. The keys to decrypt these programs are passed as a parameter to a program that is invoked on the customer's system during the conclusion of the download process. The parameter is passed in a volatile memory area, and is lost if a system outage occurs during the download process. The parameter is sufficiently intricate, so that a protection file cannot be prepared with prevailing files after the system outage has occurred.

Innovation #5:
 accidental loss or damage of a protection file, can be overcome by using backup copies, or using Innovation #1 and #2 again.

BRIEF DESCRIPTION OF THE DRAWINGS

FIG. 1 is a diagram illustrating a software product distribution overview.

FIG. 2 is a diagram illustrating how a computer system attributes are encoded in a 'key' file.

FIG. 3 is a diagram illustrating how the key is encoded as a protection file.

FIG. 4 is a diagram illustrating how the key file is sent to the product distributor.

FIG. 5 is a diagram illustrating how the product distributor prepares the corresponding protection file.

FIG. 6 is a flowchart illustrating a procedure that encrypts key information to produce the protection file.

FIG. 7 is a diagram illustrating how the protection file is sent to the client.

FIG. 8 is a flowchart illustrating how other programs validate the protection file for the current system.

FIG. 9 is a diagram illustrating how the system attributes could be encoded directly as a protection file, during a network download, without distributor involvement.

FIG. 10 is a diagram illustrating how the program that creates the protection file is activated with a special parameter string, which provides the keys to successively decrypt the programs in the encrypted program bundle.

FIG. 11 is a diagram illustrating the organization of the protection file prior to encryption, or after decryption.

FIG. 12 is a diagram illustration the organization of the composite file of encrypted protection file preparation programs.

DETAILED DESCRIPTION OF THE PREFERRED EMBODIMENTS

A description will be given of an embodiment of the present invention.

A customer system (a computer system) to which the protection system of the present inventions is applied is formed as shown in FIG. 1. Referring to FIG. 1, the customer system has a computer processing unit (CPU), display device (video display tube (VDT)), keyboard, persistent storage file system (hard disk), and either a device that can read copyable media (floppy drive, CD-ROM drive, magneto-optical (MO) disk) or a device that can participate in communication media interactions (modem, network interface card).

Two software product distribution techniques are displayed in FIG. 1. FIG. 1A illustrates a technique that distributes the software on copyable media, and acquires a protection file from the product distributor's site. FIG. 1B illustrates a technique that prepares the protection file directly on the customer system, without requiring further distributor involvement.

Protection of Products that are Distributed on Copyable Media

The product distributor prepares the contents of one or more units of copyable media. This media contains the installation program, product programs (applications) and associated files. This media also contains the key discovery program. The customer acquires the media from the product distributor by completing a terms of sale agreement. The product distributor delivers the copyable media to the customer using conventional package shipping agents. The copyable media is accompanied with a product serial number.

Software products that are distributed on copyable media are loaded into the customer's copyable-media device. An installation program that was provided by the product distributor is activated on the CPU. The installation program converts product programs and other files to a directory (folder) in the customer's storage system. The installation program then displays a fill-in-the blank registration form on the customer's display device. This form has a field where the product serial number is entered. The form has various other fields; i.e., name, mailing address, phone numbers, etc. When the customer has completed the registration form, the installation program activates the key discovery program, which prepares a binary 'key' file containing attributes that are unique to the current system environment. The binary 'key' file includes a digest that ensures the integrity of the file's contents. FIG. 2 shows the key discovery process. After the binary 'key' file has been prepared, the installation program transmits information entered in the form's fields as an electronic mail message to the product distributor. The binary 'key' file is sent as an attachment of the message. FIG. 4 shows how the message and 'key' are sent. After the message has been sent, the binary 'key' file is erased from the customer's storage system.

FIG. 5 shows how the distributor converts the key file to a protection file. When a product distributor's sales support representative receives the registration electronic mail message from the customer, the digest within the binary 'key' file is authenticated. If the digest does not match the contents of the binary 'key' file, then the file is invalid, and the sales support representative must communicate with the customer regarding the situation. The customer must initiate the product registration activity again.

If the digest matched the contents of the binary 'key' file, the information in the message and the binary 'key' file is added as an entry in the customer information database, using the product serial number as a database key (there is no relationship between a database key, and the 'key' file). If an entry with the same product serial number is discovered in the customer information database, a comparison is made between the information in the binary 'key' file that was sent with the electronic mail message, and the binary 'key' file that was previously stored in the customer information database. If these do not match, the sales support representative must communicate with the customer regarding the previous product registration. The sales support representative may establish a new sales agreement with the customer that sent the electronic mail message, in which case a new product serial number is established. The information in the message and the binary 'key' file is added as an entry in the customer information database, using the new product serial number as a database key. If the customer declines to establish a new sales agreement, then preparation of a protection file is avoided, and the product registration request is no longer processed.

If a previous entry was not present in the customer information database, or the previous entry's binary 'key' matched the message's binary 'key', or a new product serial number was established, preparation of the protection file can ensue. FIG. 3 is an overview of the conversion of the 'key' to a protection file. FIG. 6 is a flowchart of the conversion process. The generated protection file contains:

1. Key information—attributes that are unique to the customer's system
2. Gibberish—to conceal the location of the key information
3. Digest—a 16 byte binary value that ensures the integrity of the protection file The sales support representative uses a support application to activate the first protection file preparation program with the name of the binary 'key' file as a parameter. The support application passes an additional string parameter to the first protection file preparation program. Other protection file preparation programs are encrypted within a composite file, as shown in FIG. 10.

The product distributor must ensure that the sales support application, the first protection file preparation program, and other protection file preparation programs that are encrypted within a composite file are stored where only authorized employees can access them. If these are accessed by unauthorized parties, opportunities exist for illegal preparation of protection files, or reverse engineering the protection file preparation process.

The first protection file preparation program extracts information from the additional string parameter to determine how to decrypt the second protection file preparation program from the encrypted composite file. FIG. 10 illustrates the protection file preparation process. The second program is invoked with the name of the binary 'key' file as a parameter, and the remainder of the additional string parameter as a second parameter. There are four stages of protection file preparation. Each stage is performed by a different program within the encrypted composite file. Each stage except the first erases the program before it. When the last stage completes, the first protection file preparation program erases the last stage's program. FIG. 11 shows the organization of the protection file prior to encryption, or after decryption.

Stage 1: random gibberish is added to the body of the protection file.

The following is a sketch of the algorithm that is used to add gibberish to the file. Here it is assumed that the extent of the body of the protection file is 4096. Other extents could be used instead.

setRandomRoot(currentTime)
extent=4096
loop(i:1 . . . extent)
  body[i]=random( )

Stage 2: system attribute information is added to the body of the protection file.

The following is a sketch of the algorithm that is used to add system attribute information to the file. Assume the system attribute information has 16 bytes. These bytes are stored at arbitrary locations within the body of the protection file. Here the factors of 4851 are used to identify where individual bytes are stored. Note: 4851 is the sum of the first 98 integers; i.e. 1+2+. . . +98. It is recommended that the offsets are dynamically computed, instead of providing these as constants in the program.

systemAttributeInformation [ ]=AcquiresystemAttributeInformation( )
offset[ ]={3, 7, 9, 11, 21, 33, 49, 63, 77, 99, 147, 231, 441, 539, 693, 1617}
attributeLength=length(systemAttributeInformation)
loop(i:1 . . . attributeLength)
  body[offset[i]]=systemAttributeInformation[i]

Stage 3: a digital digest is appended to the end of the protection file.

The digest is computed by analyzing the body of the protection file using the MD5 algorithm. The resulting digest is 16 bytes in length. It is stored immediately after the last byte of the body of the protection file. The MD5 algorithm is distributed by RSA Security, Inc. A description of this algorithm and its source code are available in Internet RFC 1321.

Stage 4: the protection file is encrypted.

Finally, the entire protection file is encrypted using a key-less algorithm. An example of a suitable encryption algorithm follows. More sophisticated algorithms can also be used. In this algorithm contents are processed a word at a time. The size of a word is dependent on the system environment. In the algorithm below the word size is assumed to be 4 bytes. Proceeding from the left toward the middle, words are swapped with those from the right toward the middle. Before swapping, words are exclusive ORed with a mask, and then rotated leftward 20 bits. Then the mask is rotated rightward 2 bits. The value word[n] is a reference to the Nth word within the entire range of the protection file's contents. The mask value shown below is examplary. Other similar mask values could be used instead.

bodysize=4096
digestsize=16
wordsize=4
left=1
right=(bodysize+digestsize)/wordsize
middle=right/2
mask=2146426330[hexadecimal 7FEFDDDA]
loop(i:1 . . . middle)
  leftword=word[i]
  rightword=word[(right+1)−i]
  xor(leftword, mask)
  xor(rightword, mask)
  rotateLeft(leftword, 20)
  rotateLeft(rightword, 20)
  word[(right+1)−i]=leftword
  word[i]=rightword
  rotateRight(mask, 2)

After the above encryption has completed, it is difficult to determine where various bytes of the original protection file reside. In addition, the bytes of the digest have become scrambled as well. Attempts to alter the byte values of the system attribute information is considerably problematic. Altering the digest so that it matches the altered system attribute information is virtually impossible. The digest contains 128 bits (8*16). Thus, 2 to the 128th trial and error attempts are necessary to compute the correct digest that matches the body of the protection file.

Further integrity can be attained by using multiple digests. The computation of each digest augments the body of the protection file with a computable gibberish segment of arbitrary length. A gibberish segment can be computed by setting the seed of the random number generator to a known value. A sequence of random numbers is then computed. The remainder of the first random number-with respect to a known value (e.g. 250), is added to a minimal size (e.g. 250) to compute the segment's length. Byte values within the segment are determined by subsequent random numbers. If 32 digests are computed, then there are 4096 bits (8*32*16) in all. Under these circumstances, 2 to the 4096th trial and error attempts would be necessary to compute the correct digest that matches the body of the protection file.

At this point, the protection file is ready to be sent to the customer, for insertion into the appropriate directory (folder) of the customer's storage system. FIG. 7 is an overview that shows how the protection file is sent to the customer. This is done by sending an electronic mail reply to the customer's electronic mail registration request. The text of the message acknowledges that the customer has registered the product serial number. The protection file is provided as a binary file attachment. Instructions within the electronic mail message identify how and where the protection file should be stored. For example, the file should be named PROTFILE.DAT, and stored in the same directory (folder) as the product program (application) executable files. The file could be stored in other well known directories as well.

Protection of Products that are Distributed on Communication Media Downloads

FIG. 9 shows the steps that proceed when products are delivered by communication media downloads.

The product distributor prepares a communications site (internet web page). The customer uses the communication media device (modem, network interface card) to acquire software products from this communications site. The customer completes a terms of sale agreement, and a financial transaction is performed to purchase a product. Afterwards downloading of the product ensues.

The product download operation is managed by the 'Download Supervision Program', which is activated on the CPU. This program receives files from the distributor's site, and converts these to the first protection file preparation program, product programs (applications) and associated files. One of the files is the composite file that contains encrypted protection file preparation programs. Another file contains the customer's product serial number. The key discovery program is one of the programs that is prepared, in case an outage occurs which would require preparing the protection file by using the copyable media technique. All downloaded files are stored in one or more directories (folders) within the customer's storage system.

At this point the protection file preparation process is performed. The file has a name that is known by product programs (applications); such as, PROTFILE.DAT. The file is prepared in the same directory (folder) as product programs (applications). The file could be stored in other well known directories as well.

The Download Supervision Program activates the first protection file preparation program, with a string parameter. The first protection file preparation program extracts information from the additional string parameter to determine how to decrypt the second protection file preparation program from the encrypted composite file. FIG. 10 illustrates the protection file preparation process. The second program is invoked with a parameter which is the remainder of the original string parameter that followed the information that was used to extract the second program. There are four stages of protection file preparation. Each stage is performed by a different program within the encrypted composite file. Each stage erases the program before it.

More than four programs are contained within the encrypted composite file. Every other program erases the prior program, and invokes the next program, without participating in the preparation of the protection file. When the last program completes, it is the only program remaining on the customer's system. The first and last programs also do not participate in protection file preparation. If a system outage occurs during the preparation of the protection file, no more than two preparation programs will be present on the customer's system in decrypted form. Only one of these programs participates in protection file preparation. This reduces exposure of the logic contained in these programs to reverse engineering attempts.

The information required to extract and decrypt the protection file preparation programs is passed as a volatile parameter. The value of this parameter is lost when a system outage occurs. Thus, the customer does not have sufficient information to continue the protection file preparation process after the system outage has occurred. In this case, the protection file must be prepared by using the copyable media technique described earlier.

An implementation of the algorithms described here should periodically try to detect if the customer is executing the program in a debugging environment and cease to operate if so.

FIG. 11 shows the organization of the protection file prior to encryption, or after decryption.

Stage 1: Random Gibberish is Added to the Body of the Protection File.

See the algorithm that added gibberish to the protection file in the copyable media technique above.

Stage 2: System Attribute Information is Added to the Body of the Protection File.

See the algorithm that added system attribute information to the protection file in the copyable media technique above.

Stage 3: a Digital Digest is Appended to the End of the Protection File.

The MD5 algorithm is used, as described in the copyable media technique above.

Stage 4: the Protection File is Encrypted.

See the encryption algorithm that was described in the copyable media technique above.

At this point, the protection file is ready for use by product programs (applications) on the customer's system. The customer should be advised to prepare one or more backup copies of the protection file.

How Product Programs (Applications) Determine they are Executing on a Secured System FIG. 8 shows how product programs (applications) ensure that the protection file is appropriate for the current customer system.

Each product program (application) contains embedded logic that compares attributes within the protection file versus prevailing attributes of the customer's system. The protection file (e.g. PROTFILE.DAT) is located in the same directory (folder) as the product program (application), or another well known directory. Information within the protection file is processed in three stages. An implementation of these algorithms should periodically try to detect if the customer is executing the program in a debugging environment and cease to operate if so.

Stage 1: the Protection File is Decrypted.

The entire protection file is decrypted using a key-less algorithm. An example of a suitable encryption algorithm follows. If a more sophisticated algorithm was used when the file was encrypted, the counterpart decryption algorithm must be used instead.

In this algorithm file contents are processed a word at a time. The size of a word is dependent on the system environment. In the algorithm below the word size is assumed to be 4 bytes. Proceeding from the left toward the middle, words are swapped with those from the right toward the middle. Before swapping, words are rotated rightward 20 bits, add then exclusive ORed with a mask. Then the mask is rotated rightward 2 bits. The value word[n] is a reference to the Nth word within the entire range of the protection file's contents.

```
bodysize=4096
digestsize=16
wordsize=4
left=1
right=(bodysize+digestsize)/wordsize
middle=right/2
mask=2146426330[hexadecimal 7FEFDDDA]
loop(i:1 . . . middle)
   leftword=word[i]
   rightword=word[(right+1)-i]
   rotateRight(leftword, 20)
   rotateRight(rightword, 20)
   xor(leftword, mask)
   xor(rightword, mask)
   word[(right+1)-i]=leftword
   word[i]=rightword
   rotateRight(mask, 2)
```

Stage 2: a Digital Digest is Computed for the Protection File's Body.

The MD5 algorithm is used, as described in the copyable media technique above. A digest is computed for the body of the protection file and compared with the digest that resides at the end of the decrypted protection file. If these digests do not match the protection file is invalid for the current system environment, because the protection file has become corrupted intentionally or accidentally.

Stage 3: System Attribute Information is Compared Versus the Value in the Body of the Protection File.

Attributes that uniquely identify the customer's system are acquired by calling various programs available within the current system environment. The following is a sketch of the algorithm that is used to compare the acquired system attribute information to the file. Assume the system attribute information has 16 bytes. The factors of 4851 could be used to identify where the individual bytes are stored in the body of the protection file. Note: 4851 is the sum of the first 98 integers; i.e. 1+2+. . .+98.

```
systemAttributeInformation[
   ]=AcquiresystemAttributeInformation( )
offset[ ]={3, 7, 9, 11, 21, 33, 49, 63, 77, 99, 147, 231, 441,
   539, 693, 1617}
extent=length(systemAttributeInformation)
loop(i:1 . . . extent)
if mismatch(body[offset[i]],
systemAttributeInformation[i])
error( )
```

If the system attribute information does not match the values in the protection file, then the product program (application) is not permitted to execute on the current customer system. Either the file was copied from another system, or the protection file has become corrupted intentionally or accidentally. The customer can replace a corrupted protection file with a backup copy if one is available. Otherwise, a new protection file must be obtained by using the copyable media technique.

How a Protection File Preparation Program is Encrypted

Protection file preparation programs are encrypted with a variation of the encryption routine that was described earlier. The following is an example of a suitable key-less- encryption algorithm. More sophisticated algorithms can also be used. In this algorithm program contents are processed a word at a time. The size of a word is dependent on the system environment. In the algorithm below the word size is assumed to be 4 bytes Proceeding from the left toward the middle, words are swapped with those from the right toward the middle. Before swapping, words are exclusive ORed with a mask, and then rotated leftward 20 bits. Then the mask is rotated rightward 2 bits. The value word[n] is a reference to the Nth word within the entire range of the program contents. The mask and the program's origin and size are parameters to the encryption routine.

```
word[ ]=GetProgramorigin( )
programsize=GetProgramsize( )
wordsize=4
left=1
right=programsize/wordsize
middle=right/2
mask=GetMask( )
loop(i:1 . . . middle)
   leftword=word[i]
   rightword=word[(right+1)-i]
   xor(leftword, mask)
   xor(rightword, mask)
   rotateLeft(leftword, 20)
   rotateLeft(rightword, 20)
   word[(right+1)-i]=leftword
   word[i]=rightword
   rotateRight(mask, 2)
```

How the Composite File of Encrypted Protection File Preparation Programs is Prepared The composite file of encrypted protection file preparation program is prepared as a collection of segments. Gibberish segments of various sizes are added at the beginning, end, and between all of the encrypted program segments. FIG. 12 shows the organization of the composite file.

How a Protection File Preparation Program is Decrypted

Protection file preparation programs are decrypted with a variation of the decryption routine that was described earlier. The following is an example of a suitable key-less decryption algorithm. More sophisticated algorithms can also be used. In this algorithm file contents are processed a word at a time. The size of a word is dependent on the system environment. In the algorithm below the word size is assumed to be 4 bytes. Proceeding from the left toward the middle, words are swapped with those from the right toward the middle. Before swapping, words are rotated rightward 20 bits, and then exclusive ORed with a mask. Then the mask is rotated rightward 2 bits. The value word[n] is a reference to the Nth word within the entire range of the program contents. The mask and the program's origin and size are parameters to the decryption routine. These are the parameters that are passed to the various stages shown in FIG. 10; i.e. param__1, param__2, and param__3. The GetMask( ), GetProgramOrigin( ), and GetProgramSize( ) functions below obtain the values from the decryption routine's parameter string.

```
word[ ]=GetProgramorigin(parameterstring)
programsize=GetProgramsize(parameterString)
wordsize=4
left=1
right=programsize/wordsize
middle=right/2
mask=GetMask(parameterString)
loop(i:1 . . . middle)
    leftword=word[i]
    rightword=word[(right+1)−i]
    rotateRight(leftword, 20)
    rotateRight(rightword, 20)
    xor(leftword, mask)
    xor(rightword, mask)
    word[(right+1)−i]=leftword
    word[i]=rightword
    rotateRight(mask, 2)
```

Although the present invention has been described and illustrated with specific reference to certain detailed arrangements, it will be apparent to those skilled in this field that alternative embodiments will achieve the same results without deviating from the basic concept of the invention. All such embodiments and their equivalents are deemed to be within the scope of the invention as set out in the description.

What is claimed is:

1. A copy-protection system for limiting the copying of computer software transferable from a computer software product distribution site to a computer system, wherein the computer software is to be stored on the computer system, wherein the computer system includes a unique system-identifying attribute, a persistent storage file system, and a device for receiving the computer software, the copy-protection system comprising:

a. means for identifying the unique system-identifying attribute of the computer system;

b. means for generating a protection file to establish a key associated only with the unique system-identifying attribute of the computer system, wherein said means for generating a protection file includes a plurality of file protection sub-programs preceding it, and wherein said protection file includes means to prevent tampering including a message digest that is encrypted;

c. means for associating said protection file with the computer software to be protected from copying such that said protection file can only be opened using the computer system based on a comparison of the key associated with the protection file and the unique system-identifying attribute of the computer system; and d. means for transferring the computer software with associated protection file to the persistent storage file system through the device for receiving the computer software.

2. The copy-protection system as claimed in claim 1 wherein the computer software is located on a transportable copyable mass storage medium, the protection system further comprising:

a. means for remotely communicating the unique system-identifying attribute from the computer system to the product distribution site;

b. means for transferring said protection file from the product distribution site to the computer system; and c. means for transferring the computer software to the computer system.

3. The copy-protection system as claimed in claim 2 wherein the device for receiving the computer software is selected from the group consisting of floppy drives, CD-ROM drives, DVD-ROM drives, and magneto-optical readers.

4. The copy-protection system as claimed in claim 1 wherein the computer software is located on a mass storage device of the product distribution site, the protection system further comprising:

a. a protection file preparation system for generating said protection file; and b. means for downloading the computer software and said protection file preparation system from the product distribution site to the computer system.

5. The copy-protection system as claimed in claim 4 wherein the device for receiving the computer software is a communications media interaction device selected from the consisting of a modem and a communications interface card.

6. The copy-protection system as claimed in claim 1 wherein each of said file protection sub-programs includes a unique set of attributes such that each must be opened in succession.

7. The copy-protection system as claimed in claim 1 further comprising means for encrypting and decrypting said protection file.

8. A process for limiting the copying of computer software transferable from a computer software product distribution site to a computer system, wherein the computer software is located on a mass storage device of the product distribution site and is to be stored on the computer system, wherein the computer system includes a unique system-identifying attribute, a persistent storage file system, and a device for receiving the computer software, the process comprising the steps of:

a. identifying the unique system-identifying attribute of the computer system;

b. generating a protection file to establish a key associated only with the unique system-identifying attribute of the computer system;

c. associating said protection file with the computer software to be protected from copying such that said protection file can only be opened using the computer system based on a comparison of the key associated with the protection file and the unique system-identifying attribute of the computer system;

d. transferring the computer software with associated protection file to the persistent storage file system through the device for receiving the computer software;

e. creating a protection file preparation system for generating said protection file, wherein said protection file preparation system includes a plurality of file protection sub-programs, each successive one of said plurality of file protection sub-programs being designed to erase one or more sub-programs preceding it; and f. downloading the computer software and said protection file preparation system from the product distribution site to the computer system.

9. The process as claimed in claimed 8 wherein each of said file protection sub-programs includes a unique set of attributes such that each must be opened in succession.

10. The process as claimed in claim 8 further comprising the steps of encrypting said key protection file and providing means for decrypting said key protection file.

11. A copy-protection system for limiting the copying of computer software transferable from a computer software product distribution site to a computer system, wherein the computer software is to be stored on to computer system, wherein the computer the computer system includes a unique system-identifying attribute, a persistent storage file system, and a device for receiving the computer software, the copy-protection system comprising:

a. a key discovery program for identifying the unique system-identifying attribute of the computer system;

b. a protection file to establish a key associated only with the unique system-identifying attribute of the computer system, wherein said protection file is associated with the computer software to be protected from copying such that said protection file can only be opened using the computer system based on a comparison of the key associated with the protection file and the unique system-identifying attribute of the computer system;

c. means for transferring the computer software with associated protection file to the persistent storage file system through the device for receiving the computer software; and d. a protection file generating system for generating said protection file, wherein said protection file preparation system includes a plurality of file protection sub-programs, each successive one of said plurally of file protection sub-programs being designed to erase one or more sub-programs preceding it.

12. The copy-protection system as claimed in claim 11 wherein the computer software is located on a transportable copyable mass storage medium, the protection system further comprising:

a. an electronic mail link coupling the computer system to the product distribution site for remotely communicating the unique system-identifying attribute from the computer system to the product distribution site and for transferring said protection file from the product distribution site to the computer system; and b. means for transferring the computer software to the computer system.

13. The copy-protection system as claimed in claim 12 wherein the device for receiving the computer software is selected from the group consisting of floppy drives, CD-ROM drives, DVD-ROM drives, and magneto-optical readers.

14. The copy-protection system as claimed in claim 11 wherein the computer software is located on a mass storage device of the product distribution site, the protection system further comprising:

a. a protection file preparation system for generating said protection file; and b. an electronic mail link coupling the computer system to the product distribution site for downloading the computer software and said protection file preparation system from the product distribution site to the computer system.

15. The copy-protection system as claimed in claim 14 wherein the device for receiving the computer software is a communications media interaction device selected from the group consisting of a modem and a communications interface card.

16. The copy-protection system as claimed in claim 11 wherein each of said file protection sub-programs includes a unique set of attributes such that each must be opened in succession.

17. The copy-protection system as claimed in claim 11 further comprising means for encrypting and decrypting said key protection file.

18. The copy-protection system as claimed in claim 11 wherein said protection file includes means to prevent tampering with contents of said protection file.

19. The copy-protection system as claimed in claim 18 wherein said means to prevent tampering includes a message digest that is encrypted.

* * * * *